(12) United States Patent
Kroll

(10) Patent No.: US 6,537,641 B1
(45) Date of Patent: Mar. 25, 2003

(54) VEHICULAR CARPET ASSEMBLY HAVING A CONDUIT

(75) Inventor: Douglas J. Kroll, Brighton, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 09/436,128

(22) Filed: Nov. 8, 1999

(51) Int. Cl.[7] ............... B32B 3/02; B60J 7/00; B62D 25/20
(52) U.S. Cl. ............ 428/95; 428/136; 428/138; 428/172; 428/188; 296/97.23; 296/208
(58) Field of Search ............ 428/85, 95, 166, 428/188, 138, 172, 137, 136; 296/97.23, 208

(56) References Cited

U.S. PATENT DOCUMENTS

| | | |
|---|---|---|
| 3,277,811 A | 10/1966 | Fischer |
| 4,747,636 A * | 5/1988 | Harasaki et al. ............ 296/186 |
| 5,162,092 A * | 11/1992 | Klobucar et al. ............ 264/513 |
| 6,106,045 A * | 8/2000 | Gac et al. .................. 296/39.1 |

FOREIGN PATENT DOCUMENTS

| | | |
|---|---|---|
| DE | 40 33 804 A1 | 4/1992 |
| DE | 43 26 175 A1 | 2/1994 |
| WO | WO 96/18766 | 6/1996 |

\* cited by examiner

*Primary Examiner*—Donald J. Loney
(74) *Attorney, Agent, or Firm*—MacMillan, Sobanski & Todd, LLC

(57) ABSTRACT

A vehicular carpet assembly comprising an underlayment or pad attached to a carpet material. A conduit is attached to the underlayment. The conduit is adapted to receive an elongated flexible member of a type including electrical wiring, release cables, fluid hoses and the like.

7 Claims, 4 Drawing Sheets

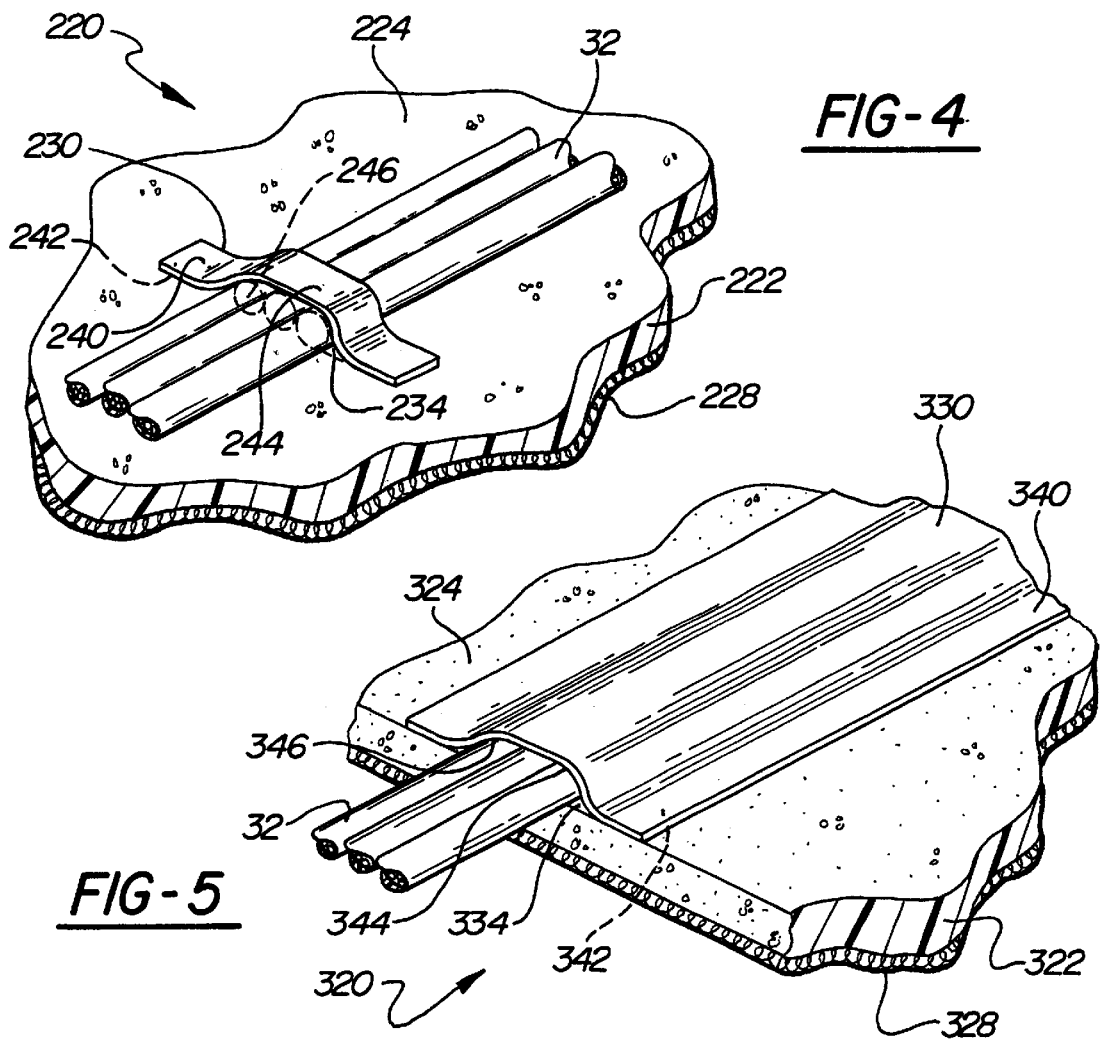
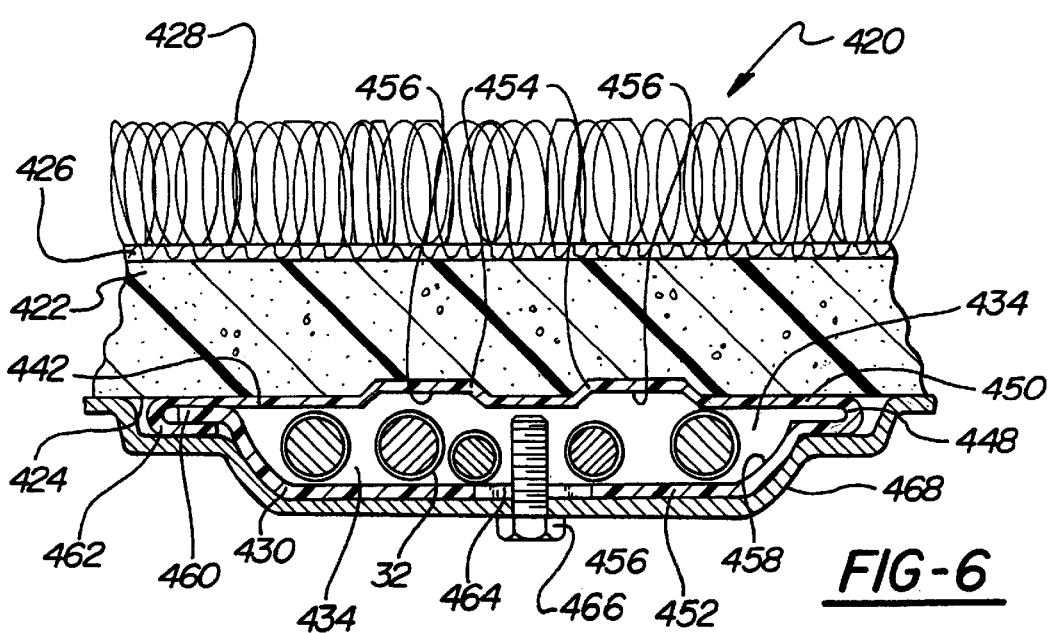

VEHICULAR CARPET ASSEMBLY HAVING A CONDUIT

TECHNICAL FIELD OF THE INVENTION

This invention relates in general to carpet assemblies for automotive vehicles and in particular to a vehicular carpet assembly having an underlayment and a conduit attached to the underlayment.

BACKGROUND OF THE INVENTION

Automotive vehicles typically employ elongated flexible members, including electrical wiring, release cables, fluid hoses and the like, to interconnect one vehicle component to another vehicle component. These flexible members are typically installed in the vehicle as separate assemblies. When installed in the vehicle, the flexible members are typically routed in the interior of the vehicle along a side sill or along a floor pan. When the flexible members are routed along either the side sill or the floor pan, the side sill or the floor pan is typically adapted in a manner to properly route and retain the flexible members. Conventional methods of adapting the side sill or the floor pan to accommodate the routing and retention of the flexible members include forming a recessed channel in the side sill or the floor pan and/or attaching a series of retaining clips to side sill or the floor pan. Having installed the flexible members in the vehicle, a covering such as a carpet assembly is installed over the flexible members.

An objective of this invention is to simplify the method of installing an elongated flexible member concealed by a vehicular carpet assembly.

Another objective of this invention is to reduce the cost and labor associated with installing a vehicular carpet assembly and an elongated flexible member concealed by the carpet assembly.

Another objective of this invention is to reduce the number of parts handled by an assembly plant, which performs the installation of a vehicular carpet assembly and an elongated flexible member concealed by the carpet assembly.

Another objective of this invention is to provide protection for an elongated flexible member concealed by a vehicular carpet assembly.

It is also an objective of this invention to provide means of easily removing an elongated flexible member from a vehicle if the flexible member should require repair or replacement.

Additionally, an objective of this invention is to simplify the structure of a side sill and/or floor pan adapted to locate and/or retain an elongated flexible member concealed by a vehicular carpet assembly.

SUMMARY OF INVENTION

This invention concerns a vehicular carpet assembly that achieves the above objects and other objects not specifically enumerated. The carpet assembly comprises an underlayment or pad attached to a carpet material. A conduit is attached to the underlayment. The conduit is adapted to receive an elongated flexible member of a type including electrical wiring, release cables, fluid hoses and the like.

In one embodiment of this invention, the conduit is integrally formed with the underlayment.

In another embodiment of this invention, the conduit has a channel formed in an attachment face for receiving the flexible member. The attachment face is attached to a bottom face of the underlayment such that the flexible member is captured between the channel wall and the bottom face. The conduit in this embodiment may be attached to the underlayment in either a removable or non-removable manner.

In still another embodiment of this invention, the conduit has a clamshell configuration that can be opened and closed, which allows the flexible member to be easily inserted into and removed from the conduit.

According to another embodiment of this invention a vehicular carpet assembly comprises an elongated flexible member of a type including electrical wiring, release cables, fluid hoses and the like integrally form with an underlayment that is attached to a carpet material.

The above-enumerated objectives and various other objectives and advantages of this invention will become apparent to those skilled in the art from the following detailed description of the preferred embodiments, when read in light of the accompanying drawings.

BRIEF DESCRIPTION OF THE DRAWINGS

FIG. 4 is a perspective view showing a portion of an underside of a third embodiment of a vehicular carpet assembly according to this invention.

FIG. 5 is a perspective view showing a portion of an underside of a fourth embodiment of a vehicular carpet assembly according to this invention.

FIG. 6 is a sectional view of a portion of a fifth embodiment of a carpet assembly according to this invention, illustrating a conduit in a closed position (shown in solid lines) and an open position (shown in phantom) and illustrating a locating means for locating the conduit to an underlayment.

DETAILED DESCRIPTION OF THE PREFERRED EMBODIMENTS

Figure 1:
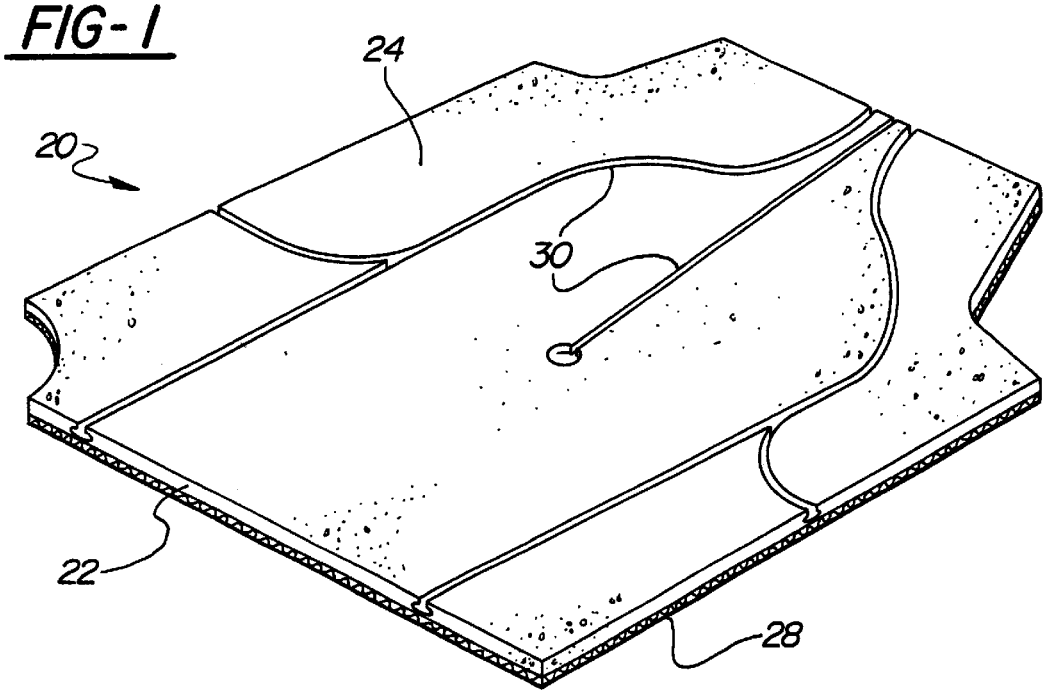
FIG. 1 is a perspective view showing an underside of a first embodiment of a vehicular carpet assembly according to this invention.

A first embodiment of a vehicular carpet assembly according to this invention is shown generally at 20 in FIG. 1. The carpet assembly 20 includes an underlayment or pad 22 having a bottom face 24 and an upper face 26 (best shown in FIG. 2). Preferably, the underlayment 22 is formed from a moldable and flexible material such as any suitable foam. A carpet material 28 of a suitable type is suitably attached to the upper face 26. Multiple conduits 30 are integrally formed in the bottom face 24. Each conduit 30 is adapted to removably receive one or more flexible member 32 (shown in FIG. 2), which is used to interconnect one vehicle component to another vehicle component. The flexible member 32 is of a type including electrical wiring, release cables, fluid hoses and the like. It should be appreciated that the number and routing paths of the conduits 30 may vary depending on a particular application. While it is understood that each conduit 30 may receive one or more flexible member 32, for the purpose of clarity, the conduit 30, as well as conduits discussed in connection with subsequently described embodiments of this invention, will be described throughout the remainder of the specification as receiving multiple flexible members 32.

Figure 2:
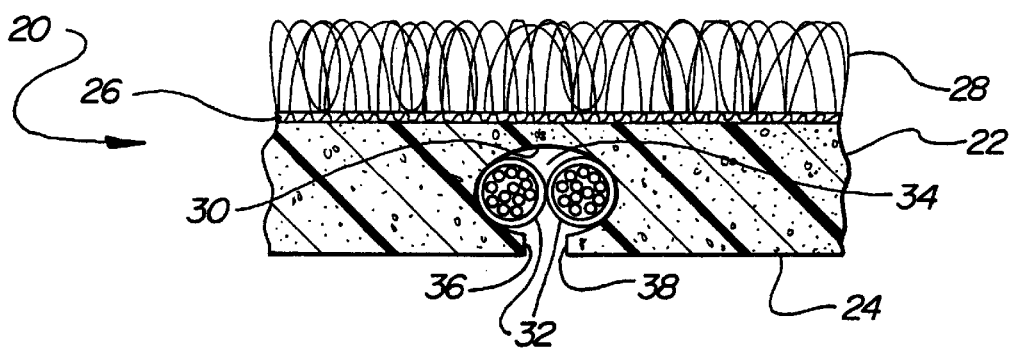
FIG. 2 is a sectional view of a portion of the carpet assembly shown in FIG. 1.

FIG. 2 is an enlarged sectional view of a portion of the carpet assembly 20 illustrating the conduit 30 in greater detail. The conduit 30 defines a cavity 34, a slot 36 and an opening 38, each of which extend between terminal ends of the conduit 30. The slot 36 connects the cavity 34 in communication with the opening 38. When installing the flexible members 32 in the conduit 30. The flexible members 32 are inserted into the cavity through the opening 38 and the slot 36. Preferably, the cavity 34 is sized to provide a snug fit for the flexible members 32 within the cavity 34. Additionally, as shown, it is preferable that the slot 36 is sized to be narrower the cavity 34 when the conduit 30 is a relaxed state. By forming the slot 36 narrower than the cavity 34, the flexible members 32 are better retained within the cavity 34. Prior to installing the carpet assembly 20 in the vehicle, the flexible members 32 are easily installed in the cavity 34 by bending the underlayment 22 in a predetermined manner, which enlarges the passage through the opening 38 and the slot 36. Additionally, this same bending motion allows the flexible members 32 to be easily removed from the underlayment 22 after the carpet assembly 10 is removed from the vehicle should it be necessary to repair or replace one or more of the flexible members 32.

Figure 3:
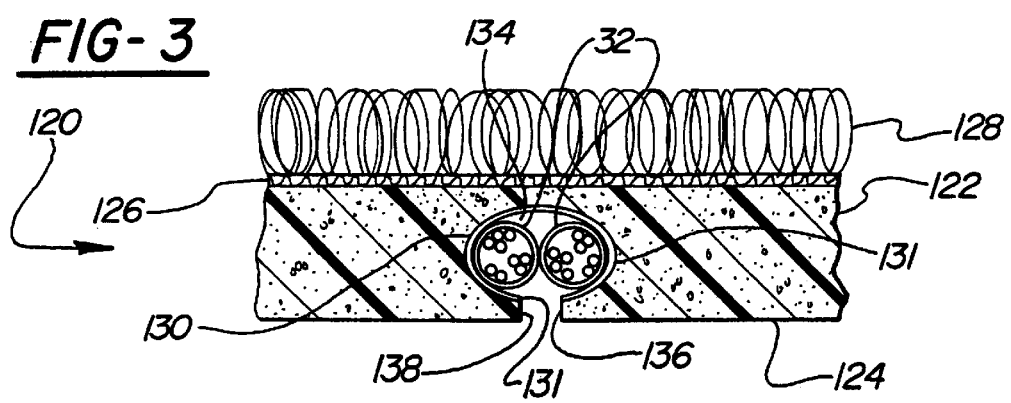
FIG. 3 is a sectional view of a portion of a second embodiment of a vehicular carpet assembly according to this invention.

A portion of a second embodiment of a vehicular carpet assembly according to this invention is shown generally at 120 in FIG. 3. The carpet assembly 120 is similar in structure and in function to the carpet assembly 20, as such similar 100 series and 10 series numbers indicate similar features. The primary difference between the carpet assemblies 120 and 20 is that the carpet assembly 120 includes multiple conduits 130 (one shown), each of which have an elongated sleeve 131 in which an underlayment 122 is molded around. The sleeves 131 are preferably formed from a flexible material such as any suitable plastic. Each sleeve 131 defines a cavity 134 for receiving the flexible members 32, which extends between terminal ends of the sleeve 131.

A slit 133 is formed through each of the sleeve 131. The slits 133 run along the entire length of the respective sleeves 131. Each slit 133 is connected in communication with a slot 136 and an opening 138 formed in the underlayment 122 so as to connect the respective cavity 134 in communication with the respective opening 138.

An advantage of molding the underlayment 122 around the sleeves 131, as compared to forming the conduits 30 integral with the underlayment 22, is that the sleeves 131 offer additional protection for the flexible members 32, which may be desirable in certain applications.

A portion of a third embodiment of a vehicular carpet assembly according to this invention is shown generally at 220 in FIG. 4. The carpet assembly 220 is similar in structure and in function to the carpet assembly 120, as such similar 200 series and 100 series numbers indicate similar features. The primary difference between the carpet assemblies 220 and 120 is that the carpet assembly 220 includes multiple conduits 230 (one shown) that extend from a bottom face 224 of an underlayment 222 as compared to the conduits 130, which are disposed within the underlayment 22.

Each conduit 230 includes a floor face 240 and an attachment face 242 (shown in phantom) opposite the floor face 240. When the carpet assembly 220 is installed in a vehicle, the floor face 240 rest along a predetermined portion of an interior surface of a vehicle such as a side sill or a floor pan (not shown). A U-shaped channel wall 244, which defines a channel 246, is formed in a central portion of the attachment face 242. Portions of the attachment face 242, which are adjacent to opposite sides of the channel wall 244, are attached to predetermined portions of the bottom face 224. Each conduit 230 is attached to the underlayment 222 by a suitable attachment means.

It should be appreciated that the carpet assembly 220 may incorporate, but is not limited to, any one of or combination of the several attachment means for attaching a conduit to an underlayment discussed in connection with the alternative embodiments described below.

As shown in FIG. 4, the channel wall 244 and the bottom face 224 define a cavity 234. Prior to installing of the carpet assembly 220 in the vehicle predetermined portions of the flexible members 32 are is disposed within the cavity 234. More preferably, the predetermined portions of the flexible members 32 are disposed in the channel 234 prior to attaching the conduit 230 to the underlayment 222.

A portion of a fourth embodiment of a vehicular carpet assembly according to this invention is shown generally at 320 in FIG. 5. The carpet assembly 320 is similar in structure and in function to the carpet assembly 220, as such similar 300 series and 200 series numbers indicate similar features. The primary difference between the carpet assemblies 320 and 220 is that the carpet assembly 320 includes a conduit 330 sized to house a greater length of the flexible members 32 as compared to length of the flexible members 32 housed or received by the conduits 230 of the carpet assembly 220 shown in FIG.4.

A portion of a fifth embodiment of a vehicular carpet assembly according to this invention is shown generally at 420 in FIG. 6. The carpet assembly 420 is similar in structure and in function to the carpet assembly 320, as such similar 400 series and 300 series numbers indicate similar features. The primary difference between the carpet assemblies 420 and 320 is that the carpet assembly 420 includes a conduit 430 having a clamshell configuration as compared to the conduit 330 having a semi-open configuration.

The conduit 430 includes a hinge portion 448 interconnecting a base portion 450 and a flap portion 452. Preferably, the hinge, base and flap portions 448, 450 and 452 are integrally formed from a flexible material.

The base portion 450 has an attachment face 442 that is suitably attached to a bottom face 424 of an underlayment 422.

As with carpet assemblies 220 and 320 described above, the carpet assembly 420 may incorporate, but is not limited to, any one of or combination of the several attachment means for attaching a conduit to an underlayment discussed in connection with the alternative embodiments described below.

The base portion 450 has one or more projections 454 (two shown) formed in the attachment face 442. The projections 454 are disposed in complementary recesses 456 formed in the bottom face 424 of the underlayment 422. The projections 454 and recesses 456 are designed to locate the conduit 430 to the underlayment 422 prior to attaching the conduit 430 to the underlayment 422. As will be made clearer below, the projections 454 and recesses 456 may be unnecessary depending on the selected means of attaching conduit 430 to the underlayment 422.

The flap portion 452 defines a U-shaped channel wall 458 formed in a central portion thereof. The hinge portion 448 extends between a first side of the channel wall 458 and a respective first side of the base portion 450. The hinge portion 448 allows the flap portion to be moved between a closed position, shown in solid lines in FIG. 6, and an open position, shown in phantom in FIG. 6. A tab 460 extends from a second side of the channel wall 458 opposite the first side of the channel wall 458. When the flap portion 452 is in the closed position, the tab 460 is received in a clip 462 that extends from a second side of the base portion 450, which is opposite the first side of the base portion 450. When in the closed position, a cavity 434 is formed between the channel wall 458 and the base portion 450, in which the flexible members 32 are housed. The flexible members 32 are inserted and removed from the conduit 430 by removing the tab 460 from the clip 462 and placing the flap portion in the open position.

Figure 7:
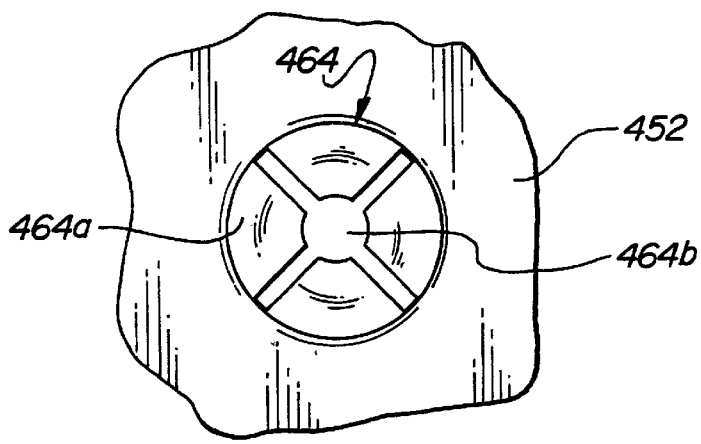
FIG. 7 is a bottom view of a portion of the carpet assembly shown in FIG. 5, illustrating a star-cut hole formed in a conduit for resiliently retaining the conduit to a fastener extending from an interior surface of a vehicle.

Referring to FIGS. 6 and 7, a star-cut hole 464 is formed through a generally flat portion of the channel wall 458. The star-cut hole 464 is designed to locate and resiliently retain the conduit 430 to a fastener 466 fixedly attached to an interior surface of a vehicle such as a floor pan 468, as shown in FIG. 6. As shown in FIG. 7, the star-cut hole 464 has multiple spaced-apart-resilient fins 464a (four shown) that terminate at a centrally located hole 464b. The hole 464b is smaller in diameter than the diameter of the fastener 466. In inserting the fastener 466 in the star-cut hole 464, the fastener 466 deflects the fins 464a, which in turn resiliently engage the fastener 466.

In use, when the flap portion 452 is in the open position, the flexible members 32 are removably inserted into the conduit 430. The flap portion 452 is then moved to the closed position by inserting the tab 460 in the clip 462. The carpet assembly 420 is installed in the vehicle by inserting the fasteners 466 in the respective star-cut holes 464. In order to repair or replace one or more of the flexible members 32, the flexible members 32 may be removed by reversing the above-described installation procedure.

FIGS. 8–12 illustrate alternative embodiments of a vehicular carpet assembly according to this invention depicting alternative attachment means for attaching a conduit to an underlayment. As previously mentioned, any one or combination of these alternative attachment means may be incorporated with the carpet assemblies 220, 320 and 420 described above.

Figure 8:
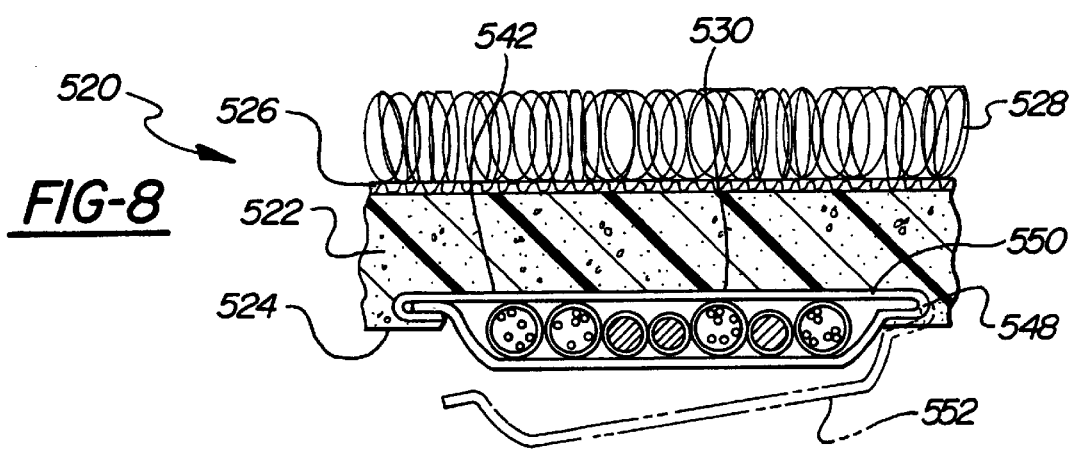
FIG. 8 is a sectional view of a portion of a sixth embodiment of a carpet assembly according to this invention, illustrating a first attachment means for attaching a conduit to an underlayment.

A portion of a sixth embodiment of a vehicular carpet assembly according to this invention is shown generally at 520 in FIG. 8. The carpet assembly 520 is similar in structure and in function to the carpet assembly 420, as such similar 500 series and 400 series numbers indicate similar features.

The carpet assembly 520 includes a conduit 530 having base portion 550. The base portion 550 has an attachment face 542. The conduit 530 further includes a hinge portion 548 and a clip 562 extending from opposite sides of the base portion 550. An underlayment 522 is molded along the attachment face 542 and over the hinge portion 548 and the clip 562 to fixedly attach the conduit 530 to the underlayment 522. It should be appreciated that attachment of the conduit 530 to the underlayment 522 in this manner renders the locating projections 454 and recesses 456 of the carpet assembly 420 obsolete.

The conduit 530 also includes a flap portion 552 extending from the hinge portion 548. The hinge portion 548 is bendable to allow the flap portion 552 to be moved between an open position and a closed position. When the flap portion 552 is in the closed position (shown in FIG. 8), a tab 560 of the flap portion 552 is removably received in the clip 562.

Figure 9:
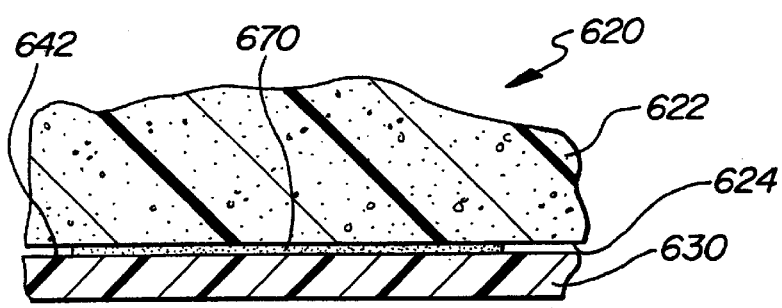
FIG. 9 is a sectional view of a portion of a seventh embodiment of a carpet assembly according to this invention, illustrating a second attachment means for attaching a conduit to an underlayment.

A portion of a seventh embodiment of a vehicular carpet assembly according to this invention is shown generally at 620 in FIG. 9. The carpet assembly 620 is similar in structure and in function to the carpet assembly 420, as such similar 600 series and 400 series numbers indicate similar features.

The carpet assembly 620 includes a conduit 630 having an attachment face 642. The carpet assembly 620 further includes an underlayment 622 having a bottom face 624. An adhesive 670 contacts predetermined portions of the attachment face 642 and respective portions of the bottom face 624 for the purpose of attaching the conduit 630 to the underlayment 622. During the process of attaching the conduit 630 to the underlayment 622, the adhesive 670 is applied to one or both of the attachment face 642 and the bottom face 624. The conduit 630 and underlayment 622 are then moved relatively toward each other to attach the conduit 630 and underlayment 622 to each other.

It may be desirable in certain applications that the adhesive 670 be a low-tack adhesive so that conduit 630 may be removably attached to the underlayment 622. As applied to an attachment means for attaching a conduit to an underlayment according to this invention, the term removably attached means that the conduit can be removed without causing damage to the conduit or the underlayment.

It should be appreciated that it may be particularly useful to incorporate an attachment means for removably attaching the conduits 230 and 330 to the respective underlayment 222, 322. Specifically, such an attachment means allows the flexible members 32 disposed between the conduits 230 and 330 and the respective underlayment 222, 322 to be removed from the carpet assemblies 220 and 320 for repair and replacement without damaging the conduits 230 and 330 or to the respective underlayment 222, 322.

It should also be appreciated that a double-sided tape (not shown) may replace the adhesive 670.

Figure 10:
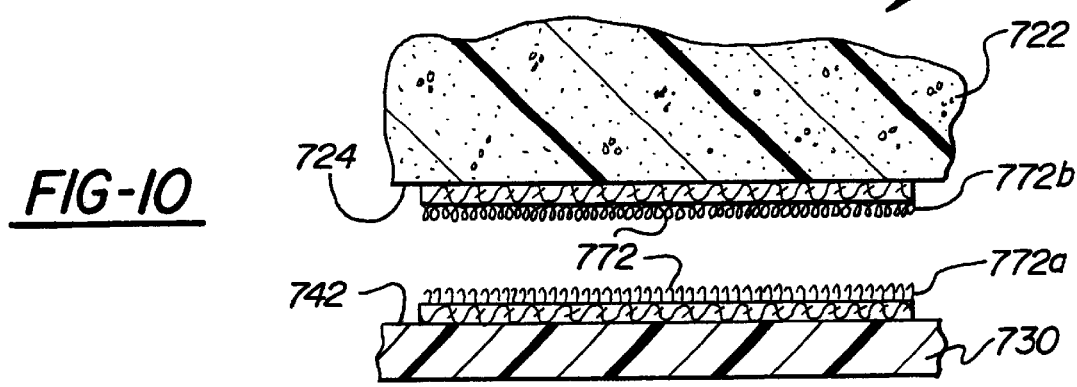
FIG. 10 is a partially exploded sectional view of a portion of an eighth sixth embodiment of a carpet assembly according to this invention, illustrating a third attachment means for attaching a conduit to an underlayment.

A portion of an eighth embodiment of a vehicular carpet assembly according to this invention is shown generally at 720 in FIG. 10. The carpet assembly 720 is similar in structure and in function to the carpet assembly 420, as such similar 700 series and 400 series numbers indicate similar features.

The carpet assembly 720 includes a hook and loop attachment means 772 for removably attaching a conduit 730 to an underlayment 722. The attachment means 772 is of a known type and includes a hook portion 772*a* and a loop portion 772*b*. As shown, the hook portion 772*a* is suitably attached to a predetermined portion of an attachment face 742 of the conduit 730. The loop portion 772*b* is suitably attached to a respective portion of a bottom face 724 of the underlayment 722. It should be appreciated the orientation of the hook and loop portions 772*a*, 772*b* may be reversed.

Figure 11:
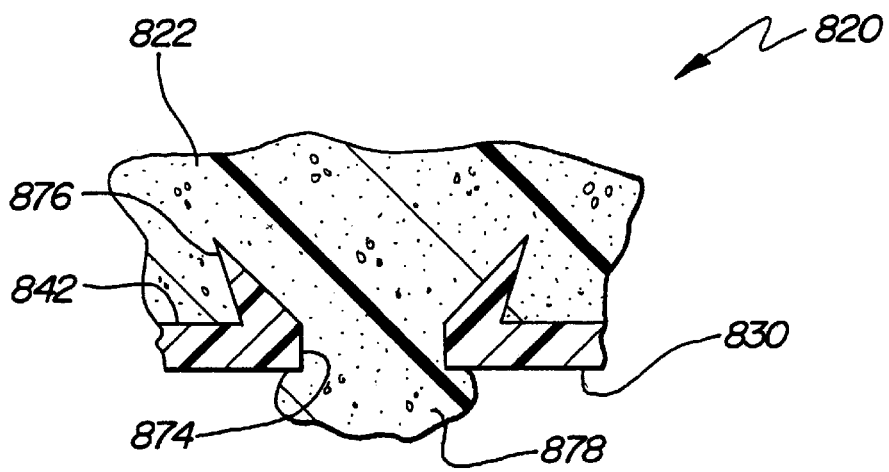
FIG. 11 is a sectional view of a portion of a ninth embodiment of a carpet assembly according to this invention, illustrating a fourth attachment means for attaching a conduit to an underlayment.

A portion of a ninth embodiment of a vehicular carpet assembly according to this invention is shown generally at 820 in FIG. 11. The carpet assembly 820 is similar in structure and in function to the carpet assembly 420, as such similar 800 series and 400 series numbers indicate similar features.

The carpet assembly 820 includes a conduit 830 having an attachment face 842. An aperture 874 is formed in the attachment face 842. The aperture 874 is preferably circular, but may be any suitable shape. A protuberance 876 extends from the attachment face 842 and surrounds the aperture 874. Preferably, the protuberance 876 is integrally formed with the attachment face 842. It should be noted that while the protuberance 876 is shown to extend away from the attachment face 842 at outward angle to form a point, the protuberance 876 may have any suitable shape and may extend from the attachment face 842 at any suitable angle. In addition, while it is preferable that the protuberance 876 is a continuous structure surrounding the aperture 874, the protuberance 876 may be replaced by multiple spaced-apart protuberances.

An underlayment 822 is molded along the attachment face 842 so as to capture the protuberance 876. In addition, the underlayment 822 is molded through the aperture 874 to form a head 878, which extends from the aperture 874 so as to cover a surface of the conduit 830 that is opposite the attachment face 842 and surrounds the aperture 874.

It should be appreciated that either the aperture 874 or the protuberance 876 may be eliminated should a particular application require less retention capacity between the conduit 830 and the underlayment 822.

Figure 12:
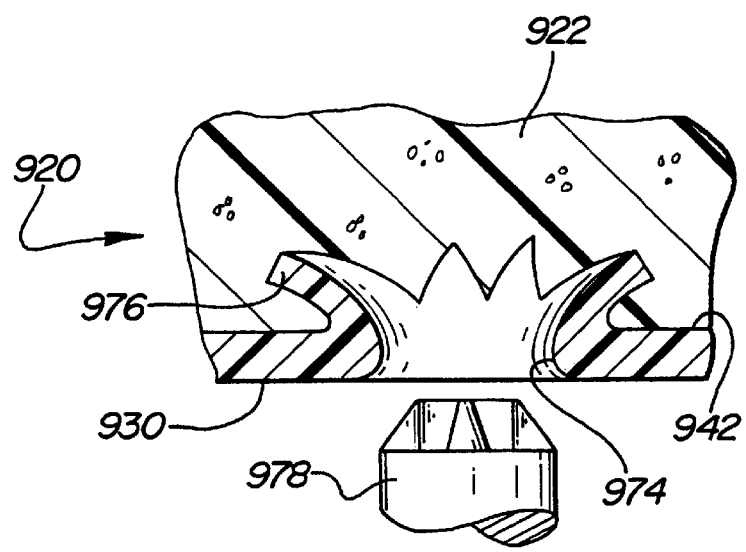
FIG. 12 is a sectional view of a portion of a tenth embodiment of a carpet assembly according to this invention, illustrating a fifth attachment means for attaching a conduit to an underlayment and illustrating an a portion of an expanding tool for forming the fourth attachment means.

A portion of a tenth embodiment of a vehicular carpet assembly according to this invention is shown generally at 920 in FIG. 12. The carpet assembly 920 is similar in structure and in function to the carpet assembly 420, as such similar 900 series and 400 series numbers indicate similar features.

The carpet assembly 920 includes a conduit 930 having an attachment face 942. An aperture 974 is formed in a predetermined portion of the attachment face 942. Preferably, the aperture 974 is generally circular, but may be any suitable shape. A protuberance 976 integrally formed with the conduit 930 surrounds the aperture 974 and extends outwardly away from the attachment face 942. The protuberance 976 projects into a predetermined portion of an underlayment 922 so that a portion of the underlayment 922 is captured or sandwiched between the protuberance 976 and an adjoining portion of the conduit 930 for the purpose of attaching the conduit 930 to the underlayment 922.

In forming the structure utilized in attaching the conduit 930 to the underlayment 922, a predetermined portion of the attachment face 942 is placed in contact with a respective portion of a bottom face 924 of the underlayment 922. An expanding end of a suitable expanding tool 978 is then forced though the conduit 930 into the underlayment 922 to form the aperture 974. The expanding end is then expanded to fold back a portion of the conduit 930 over an adjoining portion of the conduit 930 to form the protuberance 976. The expanding end is then retracted and the expanding tool 978 is removed from the conduit 930.

Figure 13:
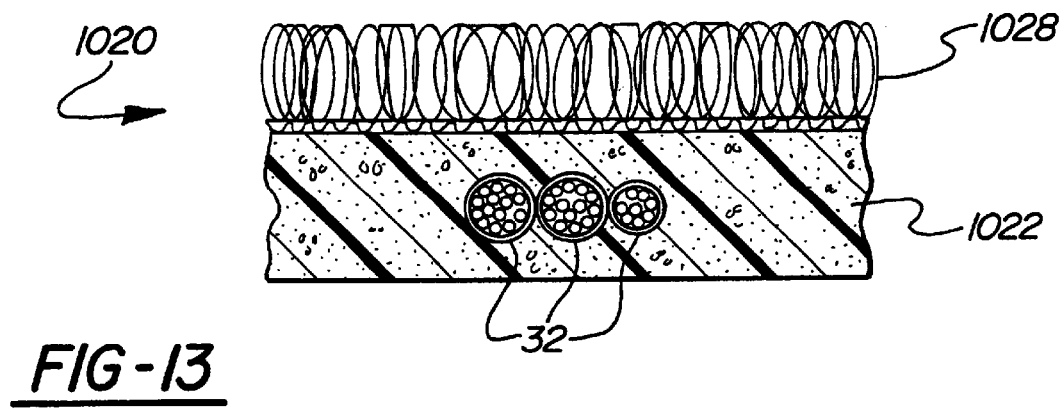
FIG. 13 is a sectional view of a portion of an eleventh embodiment of a carpet assembly according to this invention.

A portion of an eleventh embodiment of a vehicular carpet assembly according to this invention is shown generally at 1020 in FIG. 13. The carpet assembly 1020 is similar in structure and in function to the carpet assembly 20, as such similar 1000 series and 10 series numbers indicate similar features. The carpet assembly 1020 includes an underlayment 1022 molded around flexible members 32.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. A vehicular carpet assembly for covering a floor of a vehicle comprising:

an underlayment;

a conduit attached to said underlayment, said conduit being adapted to receive an elongated flexible member that interconnects one vehicle component to another vehicle component; and location means formed on at least one of said underlayment and said conduit for location said conduit and said underlayment to each other, wherein said location means includes a recess formed in one of said underlayment and said conduit and a projection formed on another of said underlayment and conduit, said projection being complementary to said recess whereby said projection is received by said recess to locate said underlayment and said conduit to each other.

2. A vehicular carpet assembly for covering a floor of a vehicle comprising:

an underlayment; and a conduit attached to said underlayment, said conduit being adapted to receive an elongated flexible member that interconnects one vehicle component to another vehicle component, wherein said conduit includes a sleeve, said underlayment being formed around at least a portion of said sleeve.

3. The carpet assembly according to claim 2 wherein said sleeve has opposite terminal ends and a slit formed therethrough, said slit extending between said terminal ends.

4. A vehicular carpet assembly for covering a floor of a vehicle comprising:

an underlayment; and a conduit attached to said underlayment, said conduit being adapted to receive an elongated flexible member that interconnects one vehicle component to another vehicle component, wherein said conduit has a base portion, a flap portion and a hinge portion, said base portion being attached to said underlayment, said hinge portion interconnecting said base portion and said flap portion, said flap portion being movable between a fully open position and a closed position.

5. The carpet assembly according to claim 4, wherein said base portion has a clip and wherein said flap portion has a tab, said tab being removably received in said clip when said flap portion is in said closed position.

6. A vehicular carpet assembly for covering a floor of a vehicle comprising:

an underlayment; and a conduit attached to said underlayment, said conduit being adapted to receive an elongated flexible member that interconnects one vehicle component to another vehicle component, wherein said conduit includes means for locating said conduit to an interior surface of a vehicle, and wherein said conduit has a star-cut hole formed through a predetermined portion of said conduit for resiliently retaining said conduit to a fastener extending from the interior surface of the vehicle.

7. A vehicular carpet assembly for covering a floor of a vehicle comprising:

an underlayment; and a conduit attached to said underlayment, said conduit being adapted to receive an elongated flexible member that interconnects one vehicle component to another vehicle component, wherein said conduit is flexible whereby bending said conduit in a predetermined manner varies the size of said opening, and wherein said conduit defines a slot in communication with said opening and said cavity, said slot being narrower than said cavity when said conduit is in an unbent state.

* * * * *